United States Patent
Solter et al.

(10) Patent No.: US 7,111,305 B2
(45) Date of Patent: Sep. 19, 2006

(54) FACILITATING EVENT NOTIFICATION THROUGH USE OF AN INVERSE MAPPING STRUCTURE FOR SUBSET DETERMINATION

(75) Inventors: Nicholas A. Solter, Irvine, CA (US); Wei Kong, Fremont, CA (US); Anil Rao, Sunnyvale, CA (US); Ashutosh Tripathi, Fremont, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 687 days.

(21) Appl. No.: 10/304,347

(22) Filed: Nov. 26, 2002

(65) Prior Publication Data
US 2004/0088716 A1  May 6, 2004

Related U.S. Application Data

(63) Continuation-in-part of application No. 10/285,176, filed on Oct. 31, 2002.

(51) Int. Cl.
*G06F 9/46* (2006.01)

(52) U.S. Cl. ...................................... 719/318
(58) Field of Classification Search ............... 719/318
See application file for complete search history.

(56) References Cited

U.S. PATENT DOCUMENTS

| 6,226,693 B1 * | 5/2001 | Chow et al. ................. 719/318 |
| 6,272,614 B1 * | 8/2001 | Calamvokis et al. ....... 711/216 |
| 6,763,384 B1 * | 7/2004 | Gupta et al. ................. 709/224 |
| 6,829,770 B1 * | 12/2004 | Hinson et al. .............. 719/318 |
| 2003/0078865 A1 * | 4/2003 | Lee .............................. 705/35 |

* cited by examiner

Primary Examiner—William Thomson
Assistant Examiner—Andy Ho
(74) Attorney, Agent, or Firm—Park, Vaughan & Fleming LLP

(57) ABSTRACT

One embodiment of the present invention provides a system that performs event notification in a distributed computing system. During operation, the system receives an event that was generated at a node in the distributed computing system, wherein the event includes a set of name/value pairs associated with the event. Next, the system compares the event against a set of client event registrations to determine a set of clients to be notified of the event, wherein each client event registration identifies a client and a target set of name/value pairs, wherein the client is to be notified of the event if the target set of name/value pairs matches a subset of the set of name/value pairs associated with the event. Finally, the system sends a notification of the event to the set of clients to be notified of the event.

15 Claims, 6 Drawing Sheets

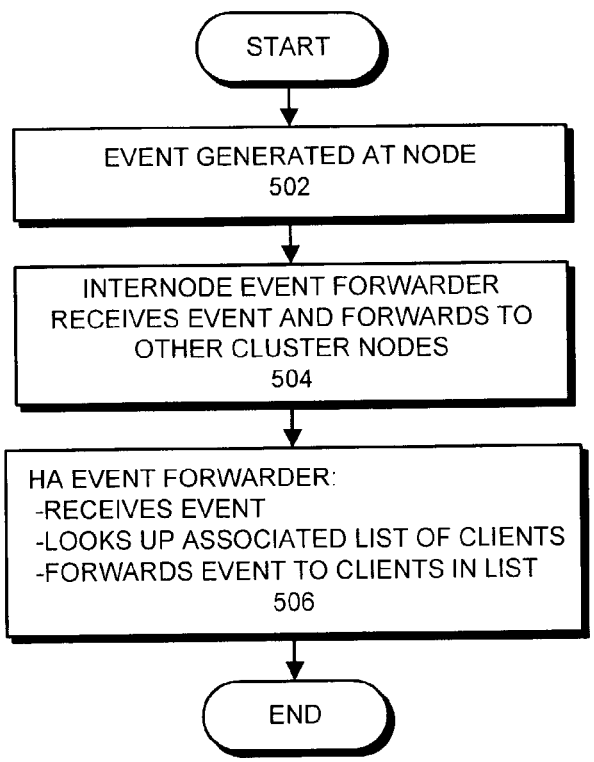
FIG. 4
FIG. 5

FACILITATING EVENT NOTIFICATION THROUGH USE OF AN INVERSE MAPPING STRUCTURE FOR SUBSET DETERMINATION

RELATED APPLICATION

This application is a continuation-in-part of a pending U.S. non-provisional patent application by inventors Ashutosh Tripathi, Andrew L. Hisgen and Nicholas A. Solter, entitled, "Method and Apparatus for Providing a Highly Available Distributed Event Notification Mechanism," having Ser. No. 10/285,176, and filing date Oct. 31, 2002. This application hereby claims priority under 35 U.S.C. 517 120 to the above-listed patent application.

BACKGROUND

1. Field of the Invention

The present invention relates to the design of distributed computing systems. More specifically, the present invention relates to a method and an apparatus that uses an inverse mapping structure for subset determination to facilitate event notification in a distributed computing system.

2. Related Art

Distributed computing systems presently make it possible to develop distributed applications that can harness the computational power of multiple computing nodes in performing a computational task. This can greatly increase the speed with which the computational task can be performed. However, it is often hard to coordinate computational activities between application components running on different computing nodes within the distributed computing system.

In order to operate properly, distributed applications must somehow keep track of the state of application components in order to coordinate interactions between the application components. This can involve periodically exchanging "heartbeat" messages or other information between application components to keep track of which application components are functioning properly.

Some distributed operating systems presently keep track of this type of information for purposes of coordinating interactions between operating system components running on different computing nodes. However, these distributed operating systems only use this information in performing specific operating system functions. They do not make the information available to distributed applications or other clients.

Hence, in many situations, a distributed application has to keep track of this information on its own. Note that the additional work involved in keeping track of this information is largely wasted because the distributed operating system already keeps track of the information. Moreover, the task of keeping track of this information generates additional network traffic, which can impede communications between nodes in the distributed computing system.

Hence, what is needed is a method and an apparatus that enables a distributed application to be notified of events that occur on different computing nodes within a distributed computing system without requiring the distributed application to perform the event monitoring operations.

One problem in performing event notification is to rapidly determine which clients are to be notified of an incoming event. The naive approach is to compare the incoming event against each of the client registrations, wherein a given client registration identifies specific events that an associated client has registered to be notified of. Note that this may require an incoming event to be compared against every client registration in the system, which can potentially be very slow.

Hence what is needed is a method and an apparatus for rapidly determine which clients are to be notified of a specific incoming event.

SUMMARY

One embodiment of the present invention provides a system that performs event notification in a distributed computing system. During operation, the system receives an event that was generated at a node in the distributed computing system, wherein the event includes a set of name/value pairs associated with the event. Next, the system compares the event against a set of client event registrations to determine a set of clients to be notified of the event, wherein each client event registration identifies a client and a target set of name/value pairs, wherein the client is to be notified of the event if the target set of name/value pairs matches a subset of the set of name/value pairs associated with the event. Finally, the system sends a notification of the event to the set of clients to be notified of the event.

In a variation on this embodiment, comparing the event against the set of client event registrations involves performing a subset determination operation to identify which client event registrations match a subset of the set of name/value pairs associated with the event.

In a further variation, for each name/value pair associated with the incoming event, performing the subset determination operation involves looking up an entry in a hash table for the name/value pair. This entry identifies which client event registrations contain matching name/value pairs. The system also increments a counter for each client event registration that contains a matching name/value pair. If the counter for a given client event registration equals the number of name/value pairs in the client event registration, the system adds the associated client to the set of clients to be notified of the event. Note that the counters are reset after each incoming event is processed.

In a variation on this embodiment, prior to receiving the event, the system initializes the hash table. This is accomplished by looking up a hash table entry for each name/value pair in each client event registration, which may involve creating hash table entries for the name/value pairs, if necessary. It also involves updating the hash table entry to point to a counter for the associated client event registration. In this way, a subsequent hash table lookup for an event can increment counters for client event registrations that contain matching name/value pairs.

In a variation on this embodiment, comparing the event against the set of client event registrations additionally involves comparing a class and a subclass associated with the event against a class and a subclass associated with each client event registration.

In a variation on this embodiment, clients can include applications or application components running within the distributed computing system. They can also include applications or application components running outside of the distributed computing system.

In a variation on this embodiment, the events can include cluster membership events, such as a node joining the cluster or a node leaving the cluster. The events can also include events related to applications, such as a state change for an application (or an application component), or a state change for a group of related applications. Note that a state change for an application (or application component) can include:

the application entering an on-line state; the application entering an off-line state; the application entering a degraded state, wherein the application is not functioning efficiently; and the application entering a faulted state, wherein the application is not functioning. The events can also include state changes related to monitoring applications or other system components, such as "monitoring started" and "monitoring stopped."

BRIEF DESCRIPTION OF THE FIGURES

FIG. 4 is a flow chart illustrating the registration process for event notification in accordance with an embodiment of the present invention.

FIG. 5 is a flow chart illustrating the process of forwarding an event in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed Computing System

Figure 1:
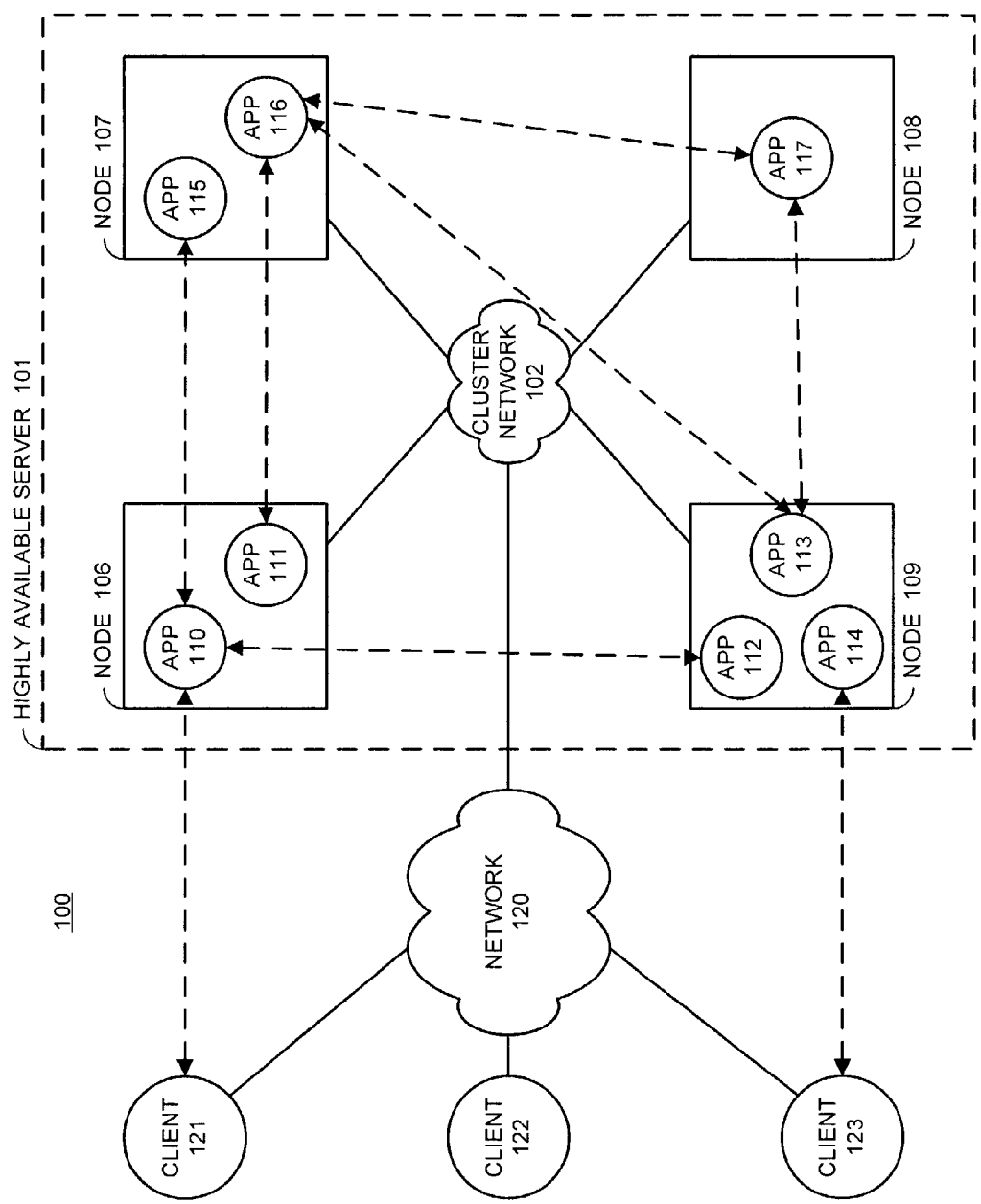
FIG. 1 illustrates a distributed computing system in accordance with an embodiment of the present invention.

FIG. 1 illustrates a distributed computing system 100 in accordance with an embodiment of the present invention. As is illustrated in FIG. 1, distributed computing system 100 includes a number of clients 121–123 coupled to a highly available server 101 through a network 120. Network 120 can generally include any type of wire or wireless communication channel capable of coupling together computing nodes. This includes, but is not limited to, a local area network, a wide area network, or a combination of networks. In one embodiment of the present invention, network 120 includes the Internet. Clients 121–122 can generally include any node on a network including computational capability and including a mechanism for communicating across the network.

Highly available server 101 can generally include any collection of computational nodes including a mechanism for servicing requests from a client for computational and/or data storage resources. Moreover, highly available server 101 is configured so that it can continue to operate even if a node within highly available server 101 fails. This can be accomplished using a failover model, wherein if an instance of an application fails, a new instance is automatically started, possibly on a different node within the distributed computing system.

In the embodiment illustrated in FIG. 1, highly available server 101 includes a number of computing nodes 106–109 coupled together through a cluster network 102. Computing nodes 106–109 can generally include any type of computer system, including, but not limited to, a computer system based on a microprocessor, a mainframe computer, a digital signal processor, a portable computing device, a personal organizer, a device controller, and a computational engine within an appliance. Cluster network 102 can generally include any type of wire or wireless communication channel capable of coupling together computing nodes. This includes, but is not limited to, a local area network, a wide area network, or a combination of networks.

Computing nodes 106–109 host a number of application components 110–117, which communicate with each other to service requests from clients 121–123. Note that application components can include any type of application (or portion of an application) that can execute on computing nodes 106–109. During operation, resources within computing nodes 106–109 provide a distributed event notification mechanism that can be used by application components 110–117 to coordinate interactions between application components 110–117. This distributed event notification mechanism is described in more detail below with reference to FIGS. 2–5.

Note that although the present invention is described in the context of a highly available server 101, including multiple computing nodes 106–109, the present invention is not meant to be limited to such a system. In general, the present invention can be applied to any type of computing system with multiple computing nodes and is not meant to be limited to the specific highly available server 101 illustrated in FIG. 1.

Computing Node

Figure 2:
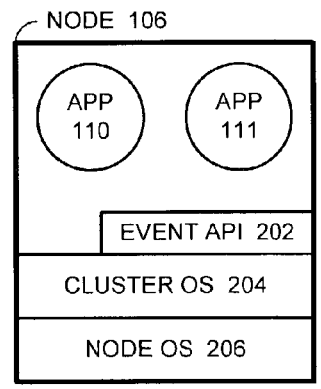
FIG. 2 illustrates a computing node in accordance with an embodiment of the present invention.

FIG. 2 illustrates a computing node 106 in accordance with an embodiment of the present invention. Computing node 106 contains a node operating system (OS) 206, which can generally include any type of operating system for a computer system. Cluster operating system (OS) 204 runs on top of node OS 206, and coordinates interactions between computing nodes 106–109.

In one embodiment of the present invention, cluster OS 204 supports failover operations to provide high availability for applications running on computing nodes 106–109. In this embodiment, cluster OS 204 ensures that state information for an application is propagated to persistent storage. In this way, if the application fails, a new instance of the application can be automatically started by retrieving the state information from persistent storage. Note that the new instance of the application can be started on either the same computing node or a different computing node. Moreover, the failover operation generally takes place without significantly interrupting ongoing operations associated with the application.

Cluster OS provides an event application programming interface (API) that can be used by application components 110–111 to receive event notifications. More specifically, event API 202 enables application components: to register to be notified of events; to post events; and to and to receive notifications for events as is described below with reference to FIGS. 3–5.

Event Forwarding Components

Figure 3:
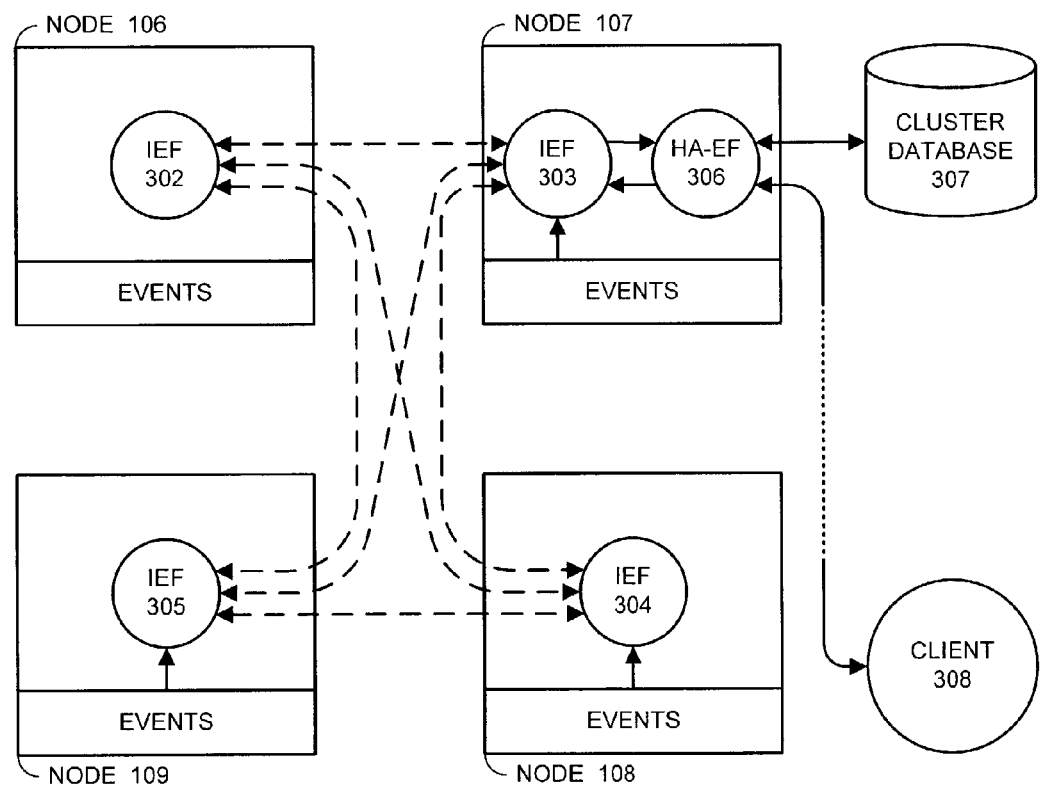
FIG. 3 illustrates components involved in the event forwarding process in accordance with an embodiment of the present invention.

FIG. 3 illustrates components involved in the event forwarding process in accordance with an embodiment of the present invention. As is illustrated in FIG. 3, computing nodes 106–109 in the highly available server 101 contain inter-node event forwarders (IEFs) 302–305, respectively. Each of these IEFs 302–305 receives events generated locally on computing nodes 106–109 and automatically communicates the events to all of the other IEFs as is illustrated by the dashed lines in FIG. 3.

Computing node 107 also contains a highly available event forwarder (HA-EF) 306, which is responsible for forwarding specific events to clients that desire to be notified of the specific events. HA-EF 306 does this by receiving an event from IEF 303 on computing node 107 and then looking up the event in a cluster database 307 to determine which clients desire to be notified of the event. HA-EF 306 then forwards the event to any clients, such as client 308, that desire to be notified of the event.

Note that client 308 can be located within computing nodes 106–109. For example, an application component 110 on computing node 106 can be notified of a change in state of an application component 115 on computing node 107. Client 308 can alternatively be located at a remote client. For example, an application on client 121 can be notified of state changes to a group of related application components 110, 115 and 112 running on computing nodes, 106, 107 and 109, respectively.

Note that HA-EF 306 is "highly available." This means that if HA-EF 306 fails, a new instance of HA-EF 306 is automatically restarted, possibly on a different computing node. Note that HA-EF 306 can be restarted using client registration information stored within cluster database 307. In one embodiment of the present invention, when a new instance of HA-EF 306 is restarted, the new instance asks for a snapshot of the event information from all of the other nodes.

Also note that cluster database 307 is a fault-tolerant distributed database that is stored in non-volatile storage associated with computing nodes 106–109. In this way, the event registration information will not be lost if one of the computing nodes 106–109 fails.

Registration Process

FIG. 4 is a flow chart illustrating the registration process for event notification in accordance with an embodiment of the present invention. The process starts when a client, such as client 308 in FIG. 3, sends a registration request to HA-EF 306 (step 402). This can involve sending the registration request to an IP address associated with HA-EF 306. (Note that this IP address can be a "highly-available" IP address that stays the same regardless of which cluster node HA-EF 306 is running on.) This registration request includes a callback address for client 308. For example, the callback address can include an Internet Protocol (IP) address and associated port number for client 308. The registration request also includes a list of events that the client is interested in being notified of.

Events in the list can include any type of events that can be detected within computing nodes 106–109. For example, the events can include cluster membership events, such as a node joining the cluster or a node leaving the cluster. The events can also involve applications. For example, the events can include: a state change for an application (or an application component) running within the distributed computing system, or a state change for a group of related applications running within the distributed computing system.

Note that a state change for an application (or application component) can include: the application entering an on-line state; the application entering an off-line state; the application entering a degraded state, wherein the application is not functioning efficiently; and the application entering a faulted state, wherein the application is not functioning. The events can also include state changes related to monitoring applications or other system components, such as "monitoring started" and "monitoring stopped." Also note that the present invention is not limited to the types of events listed above. In general, any other type of event associated with a computing node, such as timer expiring or an interrupt occurring, can give rise to a notification.

Upon receiving the registration request, HA-EF 306 records the callback address of client 308 and the list of events in cluster database 307 (step 404). HA-EF 306 then responds "success" to client 308 and the registration process is complete (step 406). After registering for an event, client 308 can simply disconnect and does not need to maintain any connections to the cluster. When an event of interest subsequently arrives, HA-EF 306 initiates a connection to client 308 to deliver the event. Thus, client 308 does not need to do any maintenance, except for maintaining an open listening socket.

Event Forwarding Process

FIG. 5 is a flow chart illustrating the process of forwarding an event in accordance with an embodiment of the present invention. This process starts when an event is generated at one of computing nodes 106–109, for example computing node 106 (step 502). This event generation may involve an application component (or operating system component) posting the event through an event API on one of the computing nodes. In one embodiment of the present invention, events can be generated through the SOLARIS™ sysevent mechanism. (SOLARIS is a registered trademark of SUN Microsystems, Inc. of Santa Clara, Calif.)

Next, a local IEF 302 on computing node 106 receives the event and forwards the event to the other IEFs 303–305 located on the other computing nodes 107–109 (step 504). In one embodiment of the present invention, the event is added to the sysevent queue in the delivered nodes, which allows the event to be treated as if it was generated locally (except that it is not again forwarded to other nodes).

Next, HA-EF 306 receives the event and looks up an associated list of clients in cluster database 307. This lookup can involve any type of lookup structure that can efficiently lookup a set of interested clients for a specific event. HA-EF 306 then forwards the event to all of the clients in the list (step 506). This completes the event notification process.

Note that the event notification process facilitates the development of distributed applications because it allows application components running on different computing nodes to be informed of state changes in related application components without having to exchange heartbeat messages or other status information between the application components.

Also note that in many applications, it is important to guarantee a total ordering of events. Hence if events are missed, it is advantageous for subsequent events to indicate the total state of the system, so that clients are not left with an incorrect view of the event ordering.

Data Structure for the Event Lookup Process

In one embodiment of the present invention, the event lookup process described in step 506 above involves an inverse mapping operation that attempts to match an incoming event with a set of client event registrations. More specifically, each incoming event specifies a class and a sub-class for the event and a set of name/value pairs associated with the event. The lookup process matches the incoming event with client event registrations that contain the same class and subclass and a subset of the name/value pairs associated with the event.

For example, a given incoming event may be associated with class="cluster," subclass="resource group state" and a number of name/value pairs: {resource group name="foo"}; {node="node1"}; and {state="online"}. This incoming event will match any client event registration with the same class and subclass and that contains a matching subset of the name/value pairs in the incoming event. (Note that it is possible for a client event registration to specify no name/value pairs, in which case any event with the same class and sub-class will match the client event registration.)

Figure 6:
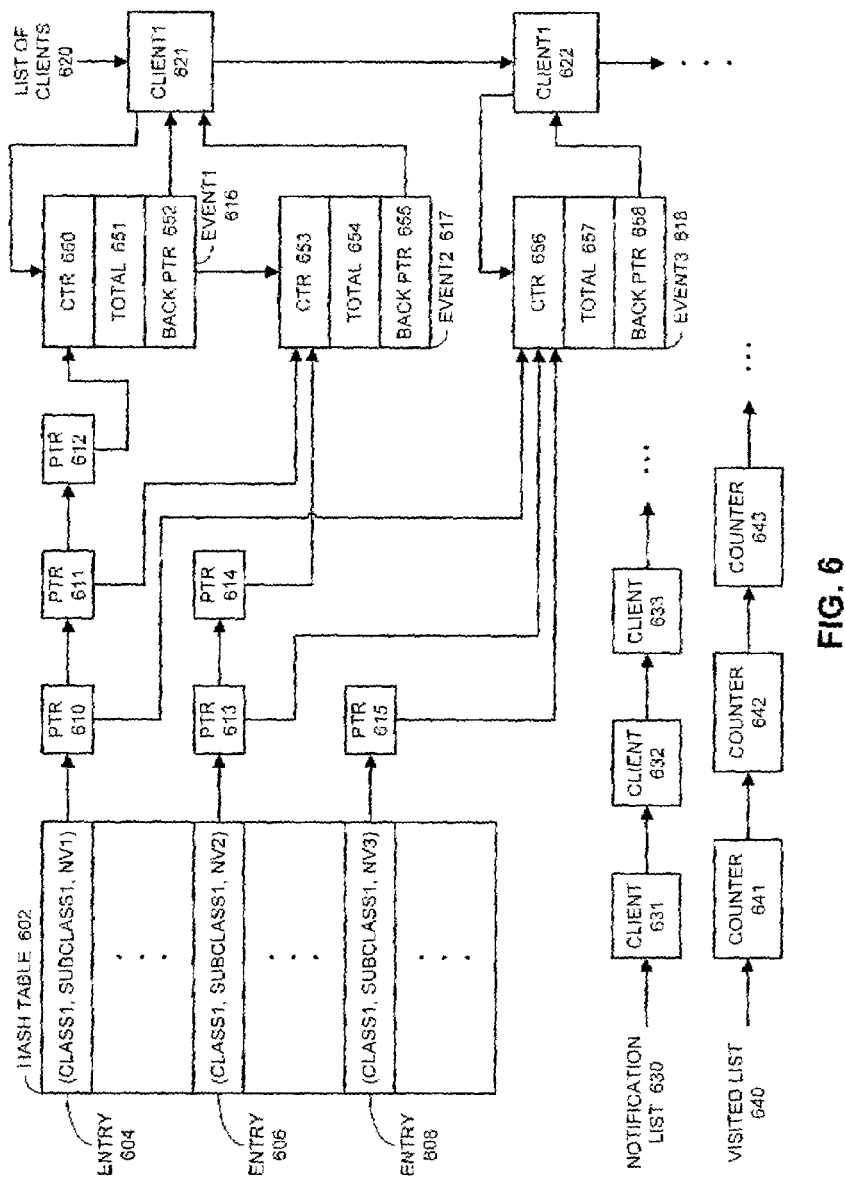
FIG. 6 illustrates various data structures that facilitate an inverse mapping operation in accordance with an embodiment of the present invention.

FIG. 6 illustrates various data structures that facilitate the inverse mapping operation in accordance with an embodiment of the present invention. These data structures include a hash table 602, which contains entries associated with a specific class, a specific subclass and a specific name/value pair.

For example, hash table 602 includes entry 604, which is associated with class1, subclass1 and name/value pair 1 (nv1). Hash table 602 also includes entry 606, which is associated with class 1, subclass 1 and name/value pair 2 (nv2). Hash table 602 additionally includes entry 608, which is associated with class 1, subclass 1 and name/value pair 3 (nv3).

Each hash table entry (604, 606 and 608) points to linked list of pointers which point to corresponding event data structures. For example, entry 604 in hash table 602 is associated with a linked list containing pointers 610, 611 and 612, which point to event1 data structures 616, event2 data structure 617 and event3 data structure 618, respectively. Entry 606 in hash table 602 similarly points to a linked list containing pointers 613 and 614, which point to event2 data structure 617 and event3 data structure 618, respectively. Finally, entry 608 in hash table 602 points to a linked list containing a single pointer 615, which points to event3 data structure 618.

Event data structures 616–618 represent specific client event registrations. For example, in FIG. 6, a client associated with client data structure 621 is registered to be notified of event1 and event2, which are associated with event1 data structure 616 and event2 data structure 617, respectively. Event1 data structure 616 and event2 data structure 617 contain back pointers 652 and 655, which point to client data structure 621, and client data structure 621 points to a list containing event1 data structure 616 and event2 data structure 617.

Similarly, a client associated with client data structure 622 is registered to be notified of event3, wherein event3 is associated with event3 data structure 618. To keep track of these associations, event3 data structure 618 contains a back pointer 658, which points to client data structure 622, and client data structure 622 points to a list containing event3 data structure 618. Note that client data structures 621 and 622 are part of a list of clients 620.

Each event is associated with a number of properties. In particular, event1 is associated with class1, subclass1 and name/value pair 1 (nv1). To keep track of this association, entry 604 in hash table 602 is associated with a pointer 612, which references counter 650 within event1 data structure 616. This allows a subsequent lookup into entry 604 to increment counter 650. Event1 data structure 616 also contains a total 651, which specifies the number of name/value pairs associated with the event. In this case, total 651 is set to "one" because event1 data structure 616 is only associated with a single name/value pair.

Whenever counter 650 is incremented, the resulting value is compared against total 651. If the resulting value matches total 651, the associated client is placed in notification list 630, so that the associated client will subsequently be notified of the event.

Event 2 is similarly associated with class1, subclass1 and nv1. However, event2 is also associated with name/value pair 2 (nv2). Hence, counter 653 within event2 data structure 617 is referenced by pointer 611 through entry 604 in hash table 602, and is also referenced by pointer 614 through entry 606 in hash table 602. Note that total 654 within event2 data structure 617 is set to the value "two" because event2 data structure 617 is associated with two name/value pairs, nv1 and nv2.

Finally event3 is associated with class1, subclass1, nv1, nv2 and name/value pair 3 (nv3). Hence, counter 656 within event3 data structure 618 is referenced by: pointer 610 through entry 604 in hash table 602; pointer 613 through entry 606; and pointer 615 through entry 608. Note that total 657 within event3 data structure 618 is set to the value "three" because event3 data structure 618 is associated with three name/value pairs, nv1, nv2 and nv3.

FIG. 6 also includes a visited list 640, which keeps track of the counters that have been incremented for an incoming event. This allows the counters to be reset after the incoming event is processed.

Process of Initializing Event Lookup Data Structures

Figure 7:
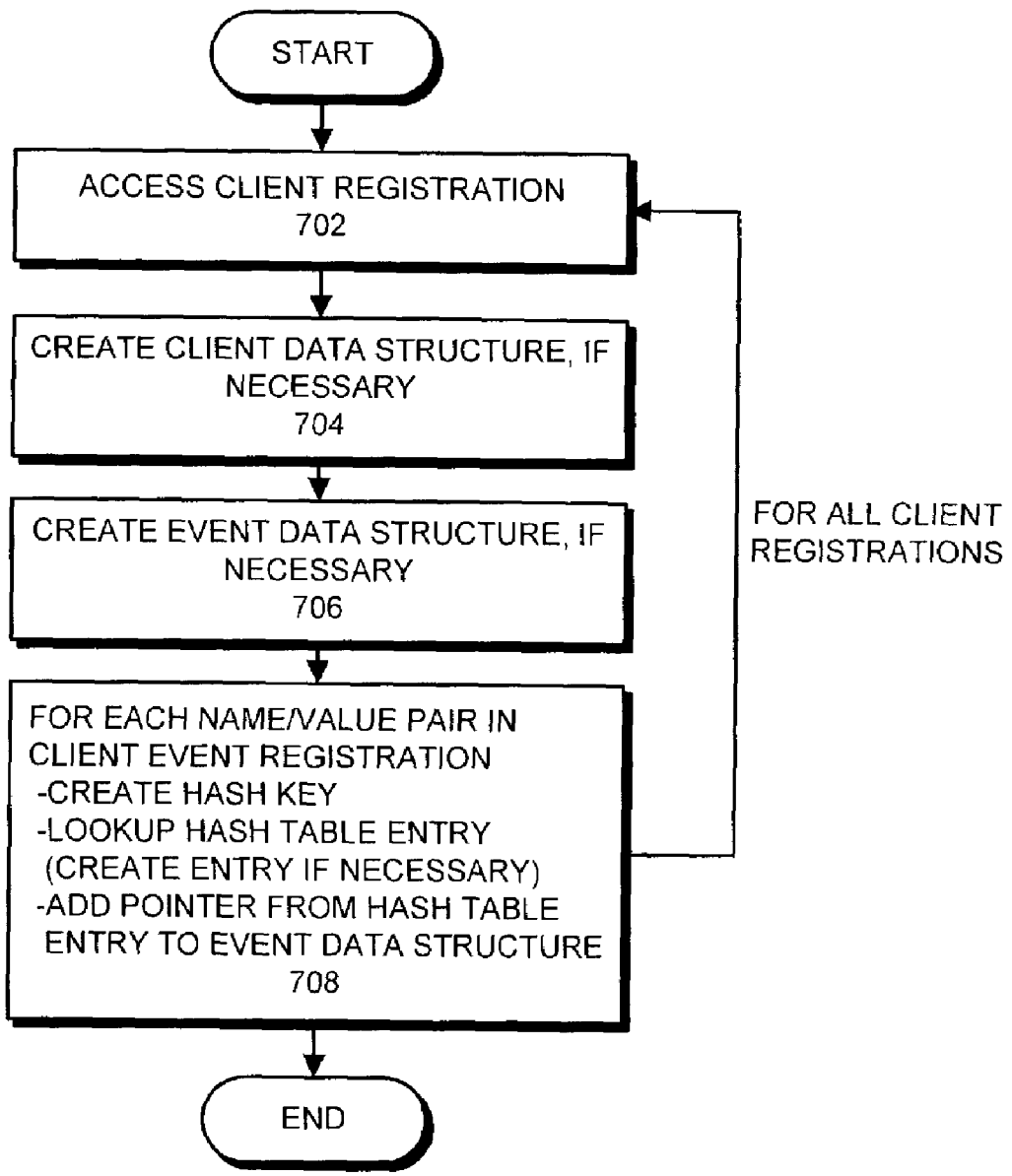
FIG. 7 presents a flow chart illustrating the process of initializing a lookup structure for the event lookup process in accordance with an embodiment of the present invention.

FIG. 7 presents a flow chart illustrating the process of initializing the lookup structure involved in the event lookup process in accordance with an embodiment of the present invention. The system starts by cycling through the client event registrations. Upon accessing a specific client event registration (step 702) the system creates a client data structure (such as client data structure 621 in FIG. 6) if one does not already exist (step 704). The system also creates an event data structure for each client event registration, such as event1 data structure 616 in FIG. 6, if one does not already exist (step 706).

Next, for each name/value pair specified in the client event registration, the system creates a hash key. For example, in FIG. 6, the hash key for entry 606 in hash table 602 is created from class1, subclass1 and name/value pair1. The system uses this hash key to perform a lookup in hash table 602. Note that this lookup may involve creating a hash table entry for the hash key if an entry does not exist. Next, the system adds a pointer from the hash table entry to the event data structure so that subsequent lookups using the same hash key can increment a counter in the event data structure (step 708).

Note that the client event registrations may be received over time as they are generated at the client computer systems during systems operation. In this case, each additional client event registrations is used to incrementally update the lookup structure.

Note that subsequent lookup operations involving the above-described data structures do not require any time-consuming string comparison operations; only fast hash table lookups and pointer lookups are required.

Operations Involved in the Event Lookup Process

Figure 8:
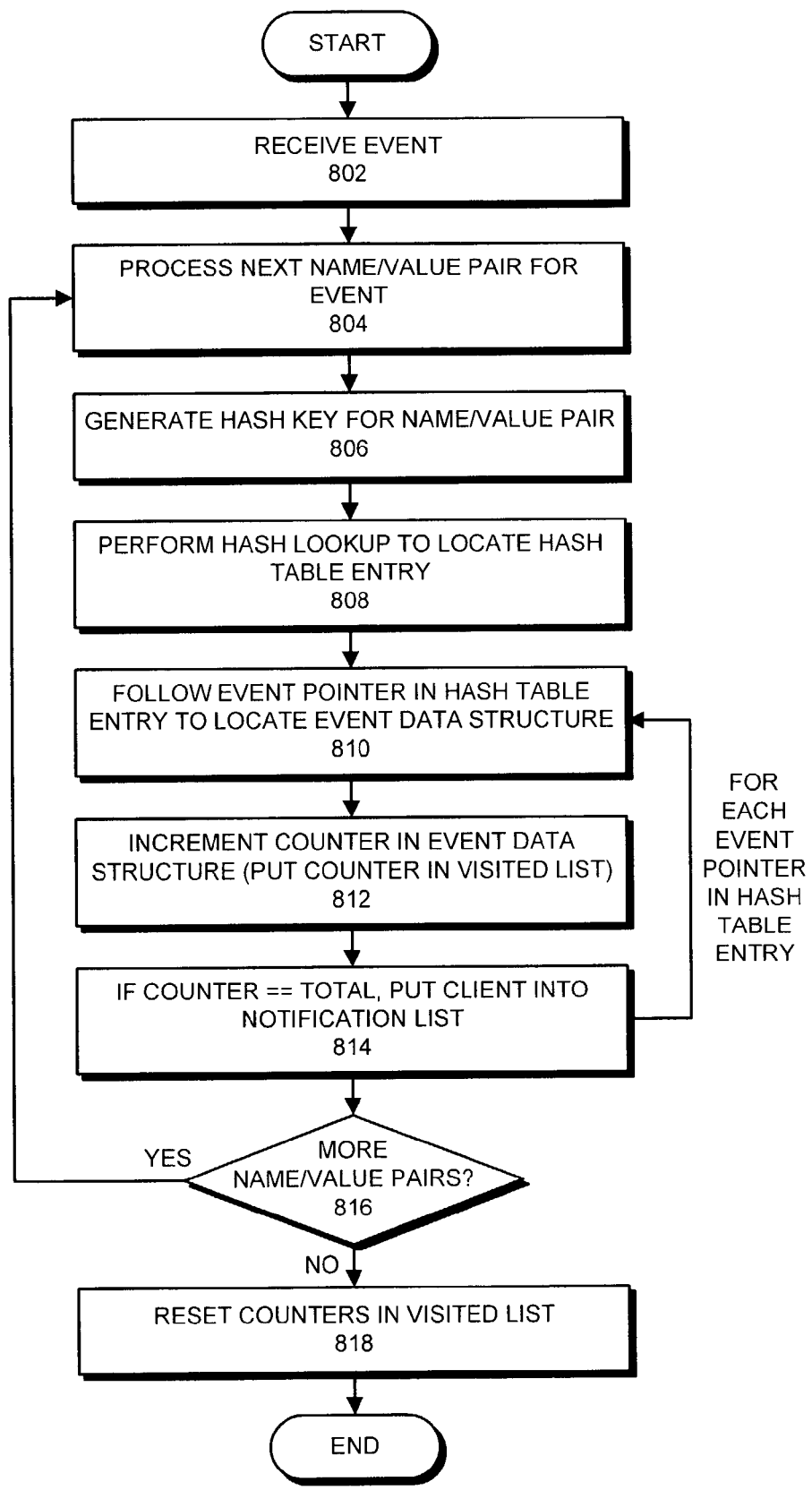
FIG. 8 presents a flow chart illustrating the event lookup process in accordance with an embodiment of the present invention.

FIG. 8 presents a flow chart illustrating the event lookup process in accordance with an embodiment of the present invention. Upon receiving an event (step 802), the system processes a name/value pair for the event (step 804). This involves generating a hash key for the name/value pair and the associated class and subclass (step 806). The system uses this hash key to perform a hash lookup to locate a corresponding hash table entry (step 808).

Next, the system follows an event pointer in the hash table entry to locate an event data structure (step 810), and then increments a counter in the event data structure (step 812). The system also places a reference to the counter in visited list 640, so that the counter can be reset after the event is processed. If a value in the counter equals the total number of name/value pairs associated with the event data structure, the system adds the associated client to notification list 630 so that the client will be notified of the event (step 814). Steps 810, 812 and 814 are repeated for each event pointer in the hash table entry.

Next, if there are more name/value pair associated with the event, the system returns to step 804 to process the next name/value pair for the event. Otherwise, the system resets all of the counters in visited list 640 (step 818). The system also sends event notifications to all clients in visited list 640 and resets visited list 640. At this point, the system is ready to process the next event.

Example Lookup

For the exemplary set of client event registrations illustrated in FIG. 6, suppose an incoming event has the following properties, class1, subclass1, name1=value1 and name2=value2. Since there are two name/value pairs (name1=value1 and name2=value2) for this event, there are two possible hash keys (class1:subclass1:name1=value1) and (class1:subclass1:name2=value2). (In FIG. 6, note that "NV1" represents name1=value1, "NV2" represents name2=value2, and "NV3" represents name3=value3.)

The system first performs a lookup based on the first hash key which returns entry 604 from hash table 602. Entry 604 points to events 616–618. Next, the system increments counters for events 616–618 so that they contain the number one. Event1, which is associated with event1 data structure 616, only requires one match, so the associated client is placed on notification list 630. Event2 and event3, which are associated with event2 data structures 617 and event3 data structure 618, respectively, require more than one match, so clients for event2 and event3 are not placed on notification list 630 yet.

Next, the system performs a second lookup based on the second hash key. This second lookup returns entry 606 from hash table 602, which points to event2 data structures 617 and event3 data structure 618. The system then increments counters 653 and 656 for event2 data structure 617 and event3 data structure 618 so that they contain the number two. Event2 only requires two matches, so the associated client is placed on notification list 630. However, event3 requires three matches, so the associated client for event3 is not put into notification list 630.

At this point, the lookup is complete, and the system sends notifications to the clients in notification list 630 and then clears notification list 630. The system refers to visited list 640 to clear all of the counters that have been incremented.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing event notification in a distributed computing system, comprising:
   receiving an event that was generated at a node in the distributed computing system, wherein the event includes a set of name/value pairs associated with the event;
   comparing the event against a set of client event registrations to determine a set of clients to be notified of the event, wherein each client event registration identifies a client and a target set of name/value pairs;
   wherein the client is to be notified of the event if the target set of name/value pairs matches a subset of the set of name/value pairs associated with the event; and
   sending a notification of the event to the set of clients to be notified of the event:
   wherein comparing the event against the set of client event registrations involves performing a subset determination operation to identify which client event registrations match a subset of the set of name/value pairs associated with the event; and
   wherein for each name/value pair associated with the event, performing the subset determination operation involves:
      looking up an entry in a hash table for the name/value pair, wherein the entry identifies which client event registrations contain matching name/value pairs,
      incrementing a counter for each client event registration that contains a matching name/value pair, and
      if the counter for a client event registration equals the number of name/value pairs in the client event registration, adding the associated client to the set of clients to be notified of the event.

2. The method of claim 1, wherein prior to receiving the event, the method further comprises initializing the hash table, which involves:
   for each name/value pair in each client event registration, creating a hash table entry for the name/value pair, if a hash table entry for the name/value pair does not exist; and
   for each name/value pair in each client event registration, updating the hash table entry to point to the counter for the associated client event registration;
   whereby a subsequent hash table lookup for an event can increment counters for client event registrations that contain matching name/value pairs.

3. The method of claim 1, wherein comparing the event against the set of client event registrations additionally involves comparing a class and a subclass associated with the event against a class and a subclass associated with each client event registration.

4. The method of claim 1, wherein clients can include:
   applications or application components running within the distributed computing system; and
   applications or application components running outside of the distributed computing system.

5. The method of claim 1, wherein the event can include:
   a node joining a cluster in the distributed computing system;
   a node leaving the cluster in the distributed computing system;
   a state change related to an application or an application component running within the distributed computing system; and
   a state change for a group of related applications running within the distributed computing system.

6. A computer-readable storage medium storing instructions that when executed by a computer cause the computer to perform a method for performing event notification in a distributed computing system, the method comprising:
   receiving an event that was generated at a node in the distributed computing system, wherein the event includes a set of name/value pairs associated with the event;
   comparing the event against a set of client event registrations to determine a set of clients to be notified of the event, wherein each client event registration identifies a client and a target set of name/value pairs;
   wherein the client is to be notified of the event if the target set of name/value pairs matches a subset of the set of name/value pairs associated with the event; and
   sending a notification of the event to the set of clients to be notified of the event;
   wherein comparing the event against the set of client event registrations involves performing a subset determination operation to identify which client event registrations match a subset of the set of name/value pairs associated with the event; and
   wherein for each name/value pair associated with the event, performing the subset determination operation involves:
      looking LIP an entry in a hash table for the name/value pair, wherein the entry identifies which client event registrations contain matching name/value pairs,
      incrementing a counter for each client event registration that contains a matching name/value pair, and
      if the counter for a client event registration equals the number of name/value pairs in the client event registration, adding the associated client to the set of clients to be notified of the event.

7. The computer-readable storage medium of claim 6, wherein prior to receiving the event, the method further comprises initializing the hash table, which involves:
   for each name/value pair in each client event registration, creating a hash table entry for the name/value pair, if a hash table entry for the name/value pair does not exist; and
   for each name/value pair in each client event registration, updating the hash table entry to point to the counter for the associated client event registration;
   whereby a subsequent hash table lookup for an event can increment counters for client event registrations that contain matching name/value pairs.

8. The computer-readable storage medium of claim 6, wherein comparing the event against the set of client event registrations additionally involves comparing a class and a subclass associated with the event against a class and a subclass associated with each client event registration.

9. The computer-readable storage medium of claim 6, wherein clients can include:
   applications or application components running within the distributed computing system; and
   applications or application components running outside of the distributed computing system.

10. The computer-readable storage medium of claim 6, wherein the event can include:
    a node joining a cluster in the distributed computing system;
    a node leaving the cluster in the distributed computing system;
    a state change related to an application or an application component running within the distributed computing system; and
    a state change for a group of related applications running within the distributed computing system.

11. An apparatus that performs event notification in a distributed computing system, comprising:
    a receiving mechanism configured to receive an event that was generated at a node in the distributed computing system, wherein the event includes a set of name/value pairs associated with the event;
    a comparison mechanism configured to compare the event against a set of client event registrations to determine a set of clients to be notified of the event, wherein each client event registration identifies a client and a target set of name/value pairs;
    wherein the client is to be notified of the event if the target set of name/value pairs matches a subset of the set of name/value pairs associated with the event; and
    a notification mechanism configured to send a notification of the event to the set of clients to be notified of the event;
    wherein the comparison mechanism is configured to perform a subset determination operation to identify which client event registrations match a subset of the set of name/value pairs associated with the event; and
    wherein for each name/value pair associated with the event, the comparison mechanism is configured to:
       look up an entry in a hash table for the name/value pair, wherein the entry identifies which client event registrations contain matching name/value pairs,
       increment a counter for each client event registration that contains a matching name/value pair, and
       if the counter for a client event registration equals the number of name/value pairs in the client event registration, to add the associated client to the set of clients to be notified of the event.

12. The apparatus of claim 11, further comprising:
    a hash table initialization mechanism;
    wherein for each name/value pair in each client event registration, the hash table initialization mechanism is configured to create a hash table entry for the name/value pair, if a hash table entry for the name/value pair does not exist; and
    wherein for each name/value pair in each client event registration, the hash table initialization mechanism is configured to update the hash table entry to point to the counter for the associated client event registration;
    whereby a subsequent hash table lookup for an event can increment counters for client event registrations that contain matching name/value pairs.

13. The apparatus of claim 11, wherein the comparison mechanism is additionally configured to compare a class and a subclass associated with the event against a class and a subclass associated with each client event registration.

14. The apparatus of claim 11, wherein clients can include:
- applications or application components running within the distributed computing system; and
- applications or application components running outside of the distributed computing system.

15. The apparatus of claim 11, wherein the event can include:
- a node joining a cluster in the distributed computing system;
- a node leaving the cluster in the distributed computing system;
- a state change related to an application or an application component running within the distributed computing system; and
- a state change for a group of related applications running within the distributed computing system.

* * * * *

UNITED STATES PATENT AND TRADEMARK OFFICE
CERTIFICATE OF CORRECTION

PATENT NO. : 7,111,305 B2 Page 1 of 1
APPLICATION NO. : 10/304347
DATED : September 19, 2006
INVENTOR(S) : Nicholas A. Solter et al.

It is certified that error appears in the above-identified patent and that said Letters Patent is hereby corrected as shown below:

In claim 6 (at column 11, line 44), please delete the word, "LIP" and replace with the word --up--.

Signed and Sealed this

Fifth Day of December, 2006

JON W. DUDAS
*Director of the United States Patent and Trademark Office*